United States Patent [19]

Erlandsson et al.

[11] Patent Number: 4,525,887
[45] Date of Patent: Jul. 2, 1985

[54] COUNTERBALANCING MECHANISM FOR THE RAMP OF A DOCKBOARD

[75] Inventors: Kjell I. Erlandsson, Milwaukee; William B. Weishar, Brookfield, both of Wis.

[73] Assignee: Kelley Company, Inc., Milwaukee, Wis.

[21] Appl. No.: 510,689

[22] Filed: Jul. 5, 1983

[51] Int. Cl.³ .................................................. E01D 1/00
[52] U.S. Cl. ........................................ 14/71.3; 14/71.1
[58] Field of Search ................. 14/71.3, 71.1, 71.7; 49/386, 379; 248/591, 595, 598; 74/106

[56] References Cited

U.S. PATENT DOCUMENTS

| | | | |
|---|---|---|---|
| 2,892,463 | 6/1959 | Frommelt et al. | 14/71.1 |
| 3,117,332 | 1/1964 | Kelley et al. | 14/71 |
| 3,201,814 | 8/1965 | Le Clear | 14/71.7 |
| 3,249,956 | 5/1966 | Zajac et al. | 14/71.3 |
| 3,486,181 | 12/1969 | Hecker et al. | 14/71.3 |
| 3,528,118 | 9/1970 | Smith | 14/71 |
| 3,646,627 | 3/1972 | Potter | 14/71.3 |
| 3,694,840 | 10/1972 | Loblick | 14/71.7 |
| 3,997,932 | 12/1976 | Artzberger | 14/71.3 |
| 4,257,136 | 3/1981 | Loblock | 14/71.3 |
| 4,343,058 | 8/1982 | Loblick | 14/71.7 |

FOREIGN PATENT DOCUMENTS 723723  2/1955  United Kingdom ................. 14/71.1

OTHER PUBLICATIONS

Kelley Company Inc. Drawing 1-10-68.

Primary Examiner—Stephen J. Novosad
Assistant Examiner—Beverly E. Hjorth
Attorney, Agent, or Firm—Andrus, Sceales, Starke & Sawall

[57] ABSTRACT

An improved counterbalancing mechanism for the ramp of a dockboard. The ramp is hinged at its rear edge to the frame of the dockboard and is adapted to be pivoted between a generally downwardly inclined position and an upward inclined position by a counterbalancing spring assembly. The counterbalancing spring assembly includes a first link pivotally connected to the underside of the ramp and a second link pivotally connected to the frame. The two links are connected together and are disposed in an acute angle relationship when the ramp is in the downwardly inclined position. One end of an extension spring is connected to the frame, while the opposite end of the spring is connected to one of the links. When the ramp is in the maximum downwardly inclined position, the spring is in a fully tensioned condition and when the holddown mechanism of the dockboard is released, the force of the spring will move the links toward an in-line position. The links are arranged so that the counterbalancing moment will slightly exceed the moment of the ramp as the ramp is pivoted, and at the elevated position of the ramp, the spring will be fully relaxed.

5 Claims, 4 Drawing Figures

COUNTERBALANCING MECHANISM FOR THE RAMP OF A DOCKBOARD

BACKGROUND OF THE INVENTION

Adjustable dockboards are mounted within a pit or depression in the loading dock and include a ramp which is hinged at its rear edge to the frame or supporting structure of the dockboard and is movable between a downwardly inclined position and an upwardly inclined position. An extension lip is pivotally connected to the forward edge of the ramp and can be moved between a downwardly hanging pendant position and an extended position where it forms an extension to the ramp and can span the gap between the ramp and the bed of a carrier or truck.

In an upwardly biased dockboard, a spring assembly is utilized to bias the ramp to the upwardly inclined position. In a dockboard of this type, a holddown mechanism is employed to retain the ramp in any position within the working range. When the holddown mechanism is manually released, the spring assembly will urge the ramp to an upwardly inclined position.

U.S. Pat. No. 3,117,332 illustrates a common form of counterbalancing mechanism utilizing an extension spring. As illustrated in that patent, the rear end of the extension spring is connected to the frame or supporting structure of the dockboard, while the forward end of the spring is connected to an arm that is also pivoted to the frame. The forward end of the arm carries a roller which rides on a curved cam surface as the spring elevates the ramp to its inclined position. The cam is designed with a curvature such that the counterbalancing force will be slightly in excess of the force of the ramp at all elevations of the ramp.

The use of the cam in the counterbalancing mechanism as disclosed in U.S. Pat. No. 3,117,332, has certain disadvantages. The engagement of the roller with the cam surface provides substantial frictional resistance to elevation of the ramp and thereby requires a larger spring force to elevate the ramp. Increasing the counterbalancing spring force makes the ramp more difficult to walk down by the operator to effect engagement by the extended lip with the truck bed. Further, the roller is subject to considerable wear which requires periodic maintenance and replacement.

Compression springs have also been utilized in the past to provide the counterbalancing action for raising the ramp. As disclosed in U.S. Pat. No. 3,528,118, a compression spring is mounted on the frame in a fore-to-aft direction and the rear end of the compression spring is connected through a crank arm to the rear end of the ramp. With this type of counterbalancing mechanism, on release of the holddown, the force of the spring will act through the crank arm to pivot the ramp to the upwardly inclined position.

Because of the type of linkages involved, the counterbalancing springs, as used in the past, have generally operated in the range of 30% to 40% of their potential energy output and thus have not taken full advantage of the total available working range.

SUMMARY OF THE INVENTION

The invention is directed to an improved counterbalancing mechanism for the ramp of a dockboard which utilizes extension springs. In accordance with the invention, the counterbalancing mechanism includes a first link, which is connected to the underside of the ramp at a first pivot, and a second link is pivotally connected to the stationary frame at a second pivot. The two links are connected together at a third pivot which is located forwardly of the first and second pivots, so that in the horizontal position of the ramp, the links are in an acute angle relationship.

Connected to one of the links is a tensioned extension spring and the rear end of the spring is connected to the stationary frame of the dockboard.

When the holddown mechanism is released, the extension spring will move the links toward an on-center position, thereby pivoting the ramp from the horizontal to the upwardly inclined position. A stop is associated with one of the links and engages the other link to limit the pivotal movement of the links in a position short of an on-center position.

The linkage is arranged so that the counterbalancing force will be slightly greater than the force of the ramp at all inclinations of the ramp.

With the counterbalancing mechanism of the invention, the extension spring will be in a fully tensioned condition when the ramp is in the maximum downwardly inclined position and the spring will be in a nearly or fully relaxed condition when the ramp is in its maximum upwardly inclined position. This results in the most efficient use of the spring mass and enables a lesser spring force to be used as well as a spring with lesser weight. More specifically, in the past, counterbalancing springs have been operated in the range of 30% to 40% efficiency, requiring a spring force in the neighborhood of about 7,000 lbs. However, with the present invention, in which the spring is operating at full efficiency, a spring having a force in the range of 3,000 lbs. can be utilized to counterbalance the same weight ramp. This not only reduces the cost of the spring, but also results in less friction at the hinge joints.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
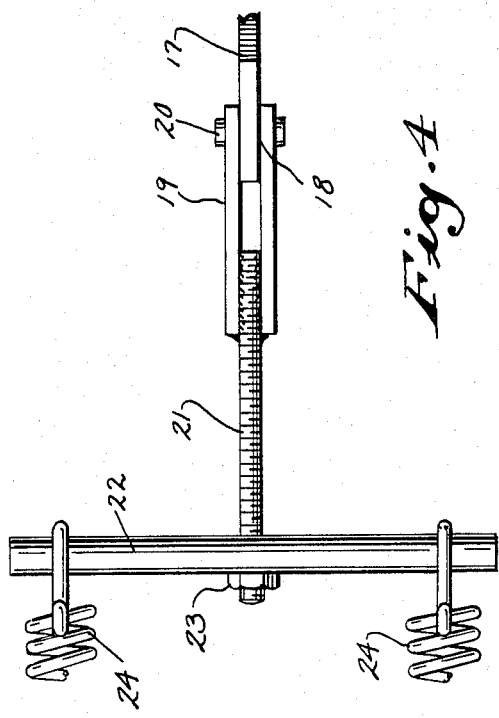
FIG. 1 is a perspective view of a dockboard utilizing a ramp counterbalancing mechanism of the invention.

FIG. 1 shows a dockboard 1 to be mounted in a pit or depression in a loading dock 2. Dockboard 1 includes a stationary frame or supporting structure 3 and a ramp or deck plate 4 is hinged at its rear edge to the frame and can be pivoted between a generally horizontal cross traffic position, as shown in FIG. 2, and an upwardly inclined position, shown in FIG. 3, as well as a downwardly inclined position.

Figure 2:
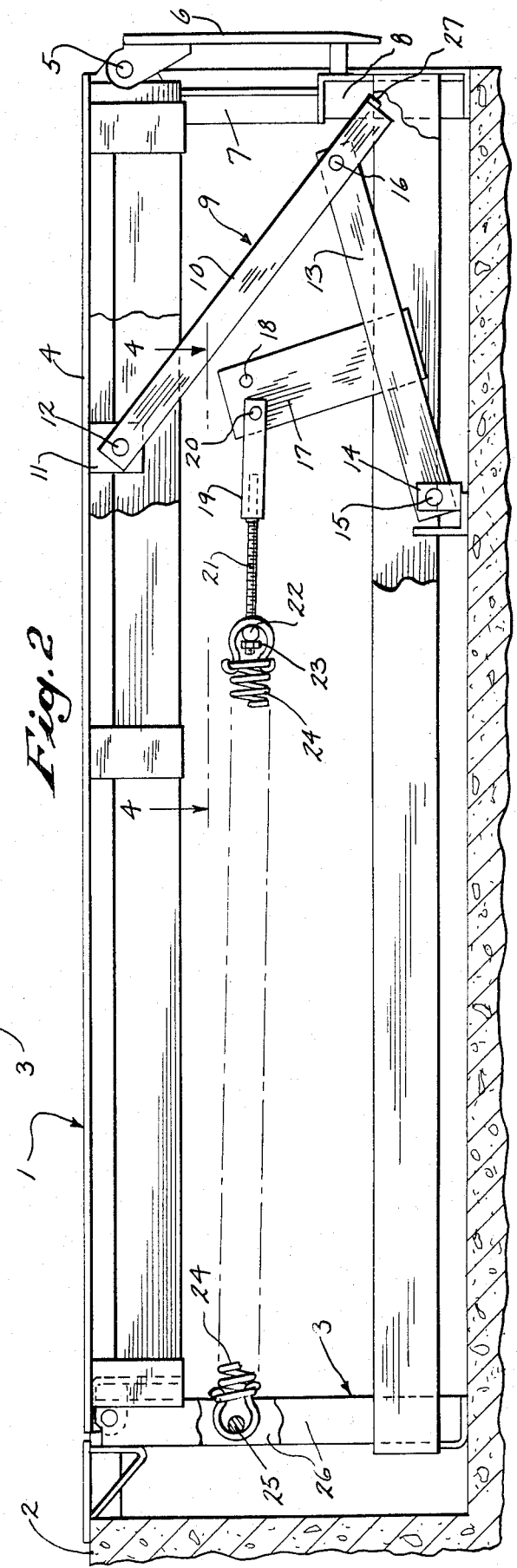
FIG. 2 is a side elevation of the dockboard with parts broken away and showing the ramp in a horizontal cross-traffic position.

Hinged to the forward edge of the ramp by hinge pin 5 is a lip 6 which can be moved between a downwardly hanging pendant position, as shown in FIG. 2, and an outwardly extended position where it forms an extension to the ramp. The lip can be pivoted to the extended position by a conventional lip lifting mechanism, not shown, which operates as a consequence of the ramp being moved to its elevated position to simultaneously move the lip to the extended position. Alternately, the lip 6 can be moved to the extended position, as the ramp is walked down from the upwardly inclined position, by a lip lifting mechanism, as described in U.S. Pat. No. 3,997,932.

The ramp is supported in the horizontal position by a pair of cross traffic legs 7 which are mounted on the underside of the ramp and rest on supports 8 which extend upwardly from the forward portion of frame 3.

Ramp 4 is adapted to be pivoted to its upwardly inclined position by a counterbalancing assembly indicated generally by 9. This spring assembly acts to counterbalance the weight of the ramp and will urge the ramp to the upwardly inclined position when a unilateral holddown mechanism, not shown, is manually released. The holddown mechanism may take the form as shown in U.S. Pat. No. 3,646,627.

The counterbalancing assembly 9 includes a double link 10 which is pivotally connected to lug 11 mounted on the underside of the ramp by pivot 12. A second link 13 is pivotally connected to lug 14 mounted on frame 3 by pivot 15. The corresponding ends of the links 10 and 13 are connected together by pivot 16. When the ramp is in the horizontal position, links 10 and 13 are in the acute angle relationship, as illustrated in FIG. 2.

Extending upwardly from the central portion of link 10 is plate 17 and the outer end of the plate is provided with a pair of holes 18. Clevis 19 is connected to one of the holes 18 by a pivot pin 20, while the opposite end of clevis 19 is connected to a threaded rod 21. Rod 21 extends through a cross bar 22 and the rear end of the rod as shown in FIG. 4, carries a nut 23.

The forward ends of extension springs 24 are connected to the ends of cross bar 22, while the rear ends of springs 24 are connected to rod 15 that extends horizontally between uprights 26 of frame 3.

Figure 4:
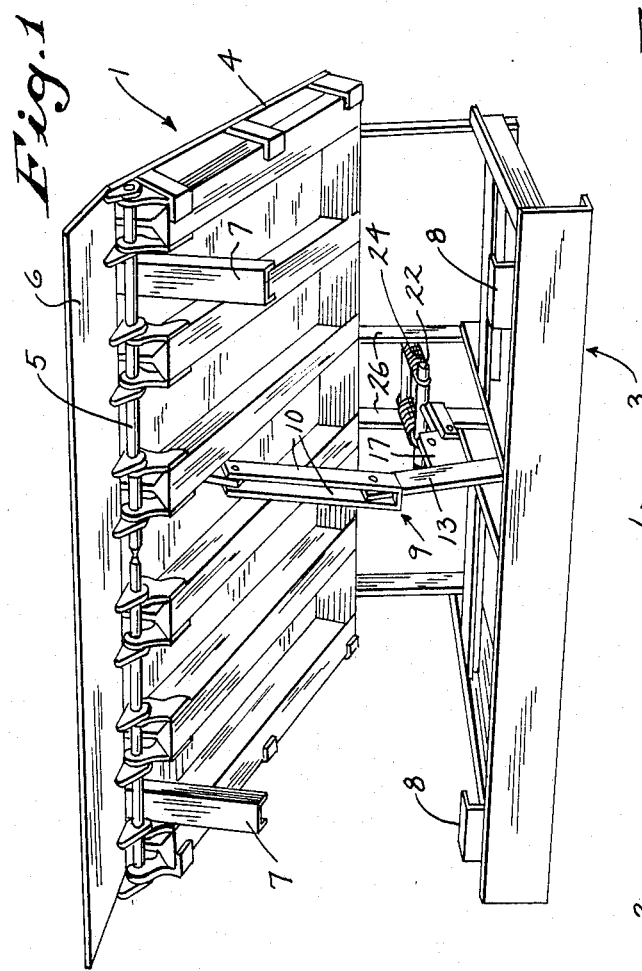
FIG. 4 is a view taken along line 4-4 of FIG. 2.
Figure 3:
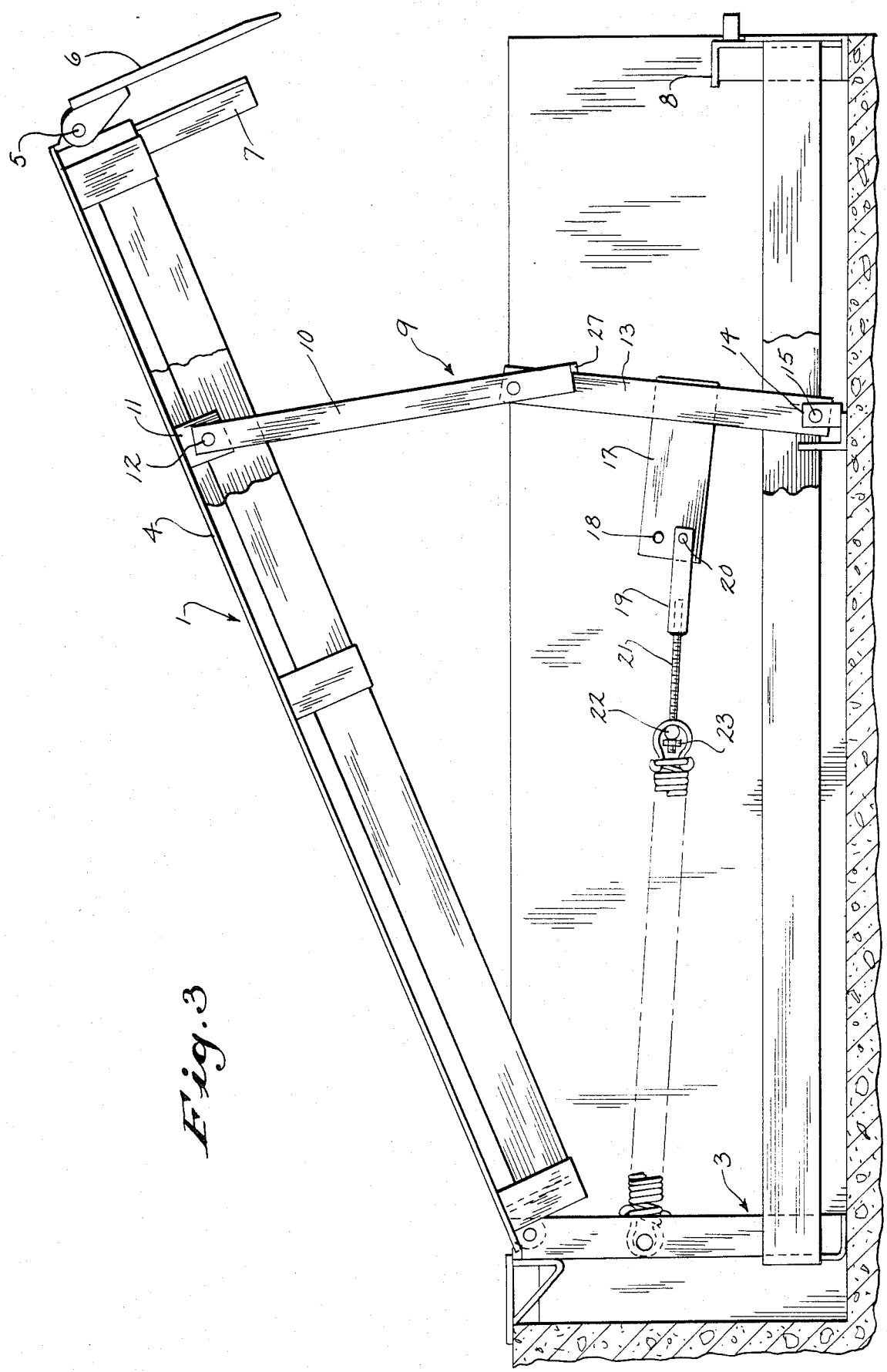
FIG. 3 is a view similar to FIG. 2 showing the ramp in the upper inclined position.

When the ramp is in the horizontal cross traffic position, as shown in FIG. 4, or in the downwardly inclined position, links 10 and 13 are located at an acute angle with respect to each other, and at the maximum downwardly inclined position springs 24 are in a fully tensioned condition. When the holddown mechanism is manually released, the force of the springs 24 will move the links 10 and 23 toward an in-line position as shown in FIG. 3, thereby causing ramp 4 to be pivoted to its upwardly inclined position. The lower ends of links 10 carry a stop 27 which engages the forward edge of the link 13, thereby limiting the pivotal movement of the links and preventing the links from moving to an in-line or toggle position. With the ramp at its fully elevated position as shown in FIG. 3, springs 24 are nearly or fully relaxed.

The geometry of the pivots 12, 15, 16 and 20 is arranged so that the counterbalancing moment will be slightly in excess of the ramp moment at all elevations of the ramp. As previously noted, the springs 24 will move from a substantially fully tensioned condition to a substantially fully relaxed condition, thereby obtaining full efficiency from the springs.

Because full efficiency of the springs is utilized, a lesser spring force can be employed which reduces the overall cost of the counterbalancing springs and enables standard cold wound springs to be employed.

As the counterbalancing mechanism eliminates the use of the roller-cam mechanism as used with extension spring counterbalancing mechanisms in the past, the frictional resistance is correspondingly reduced which enables springs of lesser force to be employed.

While the above description has shown the pivot 16 located forwardly of pivots 12 and 14 and the springs 24 extending rearwardly from links 10 and 13, it is contemplated that construction can be reversed, with the pivot 16 being positioned to the rear of pivots 12 and 14 and the springs 24 extending forwardly of the links.

Various modes of carrying out the invention are contemplated as being within the scope of the following claims particularly pointing out and distinctly claiming the subject matter which is regarded as the invention.

We claim:

1. In a dockboard having a frame and a ramp pivotally connected at its rear edge to the frame and movable between a downwardly inclined position and an upwardly inclined position, a counterbalancing mechanism for counterbalancing the weight of the ramp, comprising a first link pivotally connected to the ramp at a first pivot, a second link pivotally connected to the frame at a second pivot, said links being pivotally connected together at a third pivot, said links being in the acute angle relationship when the ramp is in the downwardly inclined position, said counterbalancing mechanism including an extension spring having a first end connected to the frame and a second end connected to said second link at a fourth pivot, said second, third and fourth pivots being disposed in triangular relationship, said fourth pivot being at a level above said second and third pivots and said fourth pivot being located forwardly of said second pivot when the ramp is in the downwardly inclined position, the force of said extension spring acting to move the links toward an in-line position and pivot the ramp from the downwardly inclined position to the upwardly inclined position, said fourth pivot being located to the rear of said second pivot when the ramp is in the upwardly inclined position.

2. The dockboard of claim 1, wherein said extension spring is substantially fully tensioned when said ramp is in the downwardly inclined position and said spring is substantially fully relaxed when the ramp is in the upwardly inclined position.

3. The dockboard of claim 1, and including stop means for limiting the pivotal movement of said links short of said in-line position.

4. The dockboard of claim 1, wherein said spring is in a generally horizontal position when the ramp is in both the downwardly inclined position and in the upwardly inclined position.

5. The dockboard of claim 1, wherein said third pivot is located forwardly of said first and second pivots.

* * * * *

UNITED STATES PATENT AND TRADEMARK OFFICE
CERTIFICATE OF CORRECTION

PATENT NO.   :   4,525,887
DATED        :   July 2, 1985
INVENTOR(S)  :   KJELL I. ERLANDSSON ET AL It is certified that error appears in the above-identified patent and that said Letters Patent is hereby corrected as shown below:

Col. 4, Line 31, CLAIM 1, Cancel "the" and substitute therefor ---an---

Signed and Sealed this

Thirty-first Day of December 1985

[SEAL]

Attest:

Attesting Officer

DONALD J. QUIGG

Commissioner of Patents and Trademarks